United States Patent
Croxford et al.

(10) Patent No.: US 10,885,313 B2
(45) Date of Patent: Jan. 5, 2021

(54) CONTROLLING A DISPLAY DEVICE

(71) Applicants: Apical Ltd, Cambridge (GB); Arm Limited, Cambridge (GB)

(72) Inventors: Daren Croxford, Swaffham Prior (GB); Simon John Craske, Cambridge (GB)

(73) Assignees: Apical Ltd., Cambridge (GB); Arm Limited, Cambridge (GB)

( * ) Notice: Subject to any disclaimer, the term of this patent is extended or adjusted under 35 U.S.C. 154(b) by 91 days.

(21) Appl. No.: 16/213,814

(22) Filed: Dec. 7, 2018

(65) Prior Publication Data

US 2020/0184199 A1    Jun. 11, 2020

(51) Int. Cl.
| | |
|---|---|
| *G06K 9/00* | (2006.01) |
| *G06F 3/01* | (2006.01) |
| *G06K 9/46* | (2006.01) |
| *G02B 5/30* | (2006.01) |
| *G06N 3/02* | (2006.01) |
| *G09G 3/22* | (2006.01) |
| *G06K 9/62* | (2006.01) |

(52) U.S. Cl.
CPC ............ *G06K 9/00281* (2013.01); *G02B 5/30* (2013.01); *G06F 3/013* (2013.01); *G06K 9/46* (2013.01); *G06K 9/6256* (2013.01); *G06N 3/02* (2013.01); *G09G 3/22* (2013.01)

(58) Field of Classification Search
CPC .... G06K 9/00281; G06K 9/46; G06K 9/6256; G02B 5/30; G06F 3/013; G06N 3/02; G09G 3/22
See application file for complete search history.

(56) References Cited

U.S. PATENT DOCUMENTS

| | | | | |
|---|---|---|---|---|
| 8,953,027 | B2* | 2/2015 | Horiuchi | G02B 27/0093 348/55 |
| 8,994,797 | B2* | 3/2015 | Yoshino | H04N 13/341 348/51 |
| 10,598,927 | B2* | 3/2020 | Weindorf | G02B 27/288 |
| 2011/0199463 | A1* | 8/2011 | Gallagher | H04N 13/334 348/53 |
| 2011/0305375 | A1* | 12/2011 | Nelson | G06F 3/005 382/118 |
| 2016/0110846 | A1* | 4/2016 | Park | G06T 5/006 345/589 |

FOREIGN PATENT DOCUMENTS

WO    2002089060    11/2002

* cited by examiner

*Primary Examiner* — Khai M Nguyen
(74) *Attorney, Agent, or Firm* — EIP US LLP

(57) ABSTRACT

Examples of the present disclosure relate to methods for controlling a display device. In one such example, data representing a result of an eyewear detection operation is obtained. Dependent on the obtained data, a control signal is outputted to adjust a display parameter of the display device. Performing the eyewear detection operation comprises receiving image data representing a user of the display device, and processing the image data using object recognition to determine whether or not the user is wearing eyewear of a predetermined type.

17 Claims, 5 Drawing Sheets

400

410

Detect a polarizing filter positioned between a display device and an eye of a user of the display device

420

Dependent on the detecting the polarizing filter, adjust an output polarization characteristic of the display device

*FIG. 4*

CONTROLLING A DISPLAY DEVICE

TECHNICAL FIELD

The present invention relates to methods and apparatuses for controlling a display device.

BACKGROUND

A large number of electronic devices are capable of displaying visual content to a user, such as image, text or video content. Such display devices range from the relatively large, such as televisions, to the relatively small and portable, such as mobile telephones and smart watches. Display devices can be viewed in a variety of different lighting conditions. Many display devices, e.g. readily portable display devices, can be used both indoors and outdoors, each of which may have different associated light conditions.

Display parameters of a display device may be adjustable. Examples of display parameters, or "display settings", include luminance and/or brightness, contrast, color levels and/or balance, gamma correction and tone mapping. The display parameters of a display device may be adjusted so as to optimize a perceived level of visual clarity or quality of displayed content, and/or a viewing experience.

SUMMARY

According to a first aspect of the present disclosure, there is provided a method of controlling a display device, the method comprising:
obtaining data representing a result of an eyewear detection operation; and
dependent on the obtained data, outputting a control signal to adjust a display parameter of the display device,
wherein performing the eyewear detection operation comprises:
receiving image data representing a user of the display device; and
processing the image data using object recognition to determine whether or not the user is wearing eyewear of a predetermined type.

According to a second aspect of the present disclosure, there is provided an apparatus for controlling a display device, the apparatus comprising:
an eyewear detector configured to obtain data representing a result of an eyewear detection operation; and
a display adjuster configured to, dependent on the obtained data, output a control signal to adjust a display parameter of the display device,
wherein performing the eyewear detection operation comprises:
receiving image data representing a user of the display device; and
processing the image data using object recognition to determine whether or not the user is wearing eyewear of a predetermined type.

According to a third aspect of the present disclosure, there is provided a method of controlling a display device, the method comprising:
detecting a polarizing filter positioned between the display device and an eye of a user of the display device; and
dependent on the detecting the polarizing filter, adjusting an output polarization characteristic of the display device.

Further features and advantages of the invention will become apparent from the following description of preferred embodiments of the invention, given by way of example only, which is made with reference to the accompanying drawings.

BRIEF DESCRIPTION OF THE DRAWINGS

FIG. 4 shows schematically a method of controlling a display device according to an example.

DETAILED DESCRIPTION

Examples described herein enable display parameters of a display device to be adjusted on the basis of an eyewear detection operation. The eyewear detection operation involves using image processing to determine whether or not a user of the display device is wearing eyewear of a predetermined type. For example, a luminance level of the display device may be increased in response to determining that the user is wearing sunglasses, or may be decreased in response to determining that the user is not wearing sunglasses. As such, the display of visual content may be optimized for viewing by taking into account the presence of physical barriers, e.g. optical filters, positioned between the display device and the user's eyes.

Figure 1:
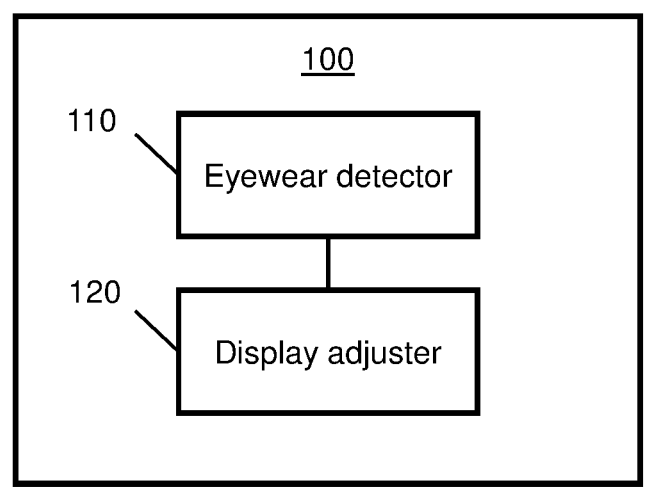
FIG. 1 shows schematically an apparatus for controlling a display device according to an example.

FIG. 1 shows schematically an apparatus 100 for controlling a display device (not shown). In some examples, the apparatus 100 is comprised in a computing device. The computing device may be a mobile computing device, such as a smartphone device, tablet device, laptop device or smart watch device. In another example, the apparatus 100 is comprised in a smart home device. An example of a smart home device is a home automation device. A smart home device may be arranged to control aspects of an environment including, but not limited to, display devices.

The apparatus 100 may comprise one or more processor components that may be communicatively coupled via at least one bus. Operations performed by the processor components may be carried out by hardware and/or software. Each of the processor components may be implemented using machine readable instructions and suitably programmed or configured hardware, such as circuitry. Each of the processor components can include a microprocessor, microcontroller, processor module or subsystem, programmable integrated circuit, programmable gate array or other computing device. The processor components may comprise multiple co-located processors or multiple disparately located processors. In some examples, the apparatus 100 comprises computer-useable volatile and/or non-volatile memory configured to store information and/or instructions for the processor components. The computer-useable memory may comprise random access memory (RAM) and/or read-only memory (ROM).

In some examples, the apparatus 100 comprises or is comprised in the display device. The apparatus 100 and the display device may be comprised in the same physical housing. For example, both the apparatus 100 and the display device may form part of a mobile telephone device.

In other examples, the apparatus 100 is separate from the display device. The display device may be arranged remotely from the apparatus 100. The display device and the apparatus 100 may be arranged in separate physical housings in some examples. For example, the display device may comprise a television and the apparatus 100 may comprise a smart home device configured to control the television. The apparatus 100 may be communicatively couplable to the display device, e.g. via one or more wired and/or wireless connections. The apparatus 100 is configured to control the display device by outputting control signals to control operation of the display device.

The display device may comprise or be comprised in a mobile computing device, e.g. a mobile telephone. Other examples of display devices include, but are not limited to, head-mounted displays (HMDs), monitors, televisions, tablet devices, laptop devices, display panels and wearable display equipment.

The apparatus 100 comprises an eyewear detector 110 and a display adjuster 120. Each of the eyewear detector 110 and the display adjuster 120 may comprise a processor component of the apparatus 100. Each of the eyewear detector 110 and the display adjuster 120 may comprise a "function" of the apparatus 100. The term "function" is used herein to denote a component of an entity (in this instance the apparatus 100) that serves a given purpose. Such a component may be embodied in various ways. For example, the component may be embodied in hardware and/or software. The component may comprise a processor, chip, integrated circuit or logic block. As such, a function may comprise an electronic component.

The eyewear detector 110 and the display adjuster 120 may be co-located, e.g. located in a single housing. In some examples, the eyewear detector 110 and the display adjuster 120 are part of a distributed system, e.g. located in different housings.

The apparatus 100 may comprise more, fewer and/or different components than those shown in the example of FIG. 1. For example, the apparatus 100 may comprise an image sensor configured to obtain image data. The image sensor may be comprised in a camera, for example. The apparatus 100 may comprise other components such as a memory, an image signal processor (ISP), a video encoder and/or decoder, etc.

The eyewear detector 110 is configured to obtain data representing a result of an eyewear detection operation, as will be described in more detail below. The eyewear detection operation comprises receiving image data representing a user of the display device, and processing the image data using object recognition to determine whether or not the user is wearing eyewear of a predetermined type.

In some examples, the eyewear detector 110 performs the eyewear detection operation. As such, the data representing the result of the eyewear detection operation may be generated by the eyewear detector 110. In such examples, the eyewear detector 110 includes image processing and/or object recognition functionality. In examples where the apparatus 100 comprises an image sensor, the image sensor may be configured to generate the image data representing the user, and output the image data to be processed by the eyewear detector 110.

In other examples, the eyewear detector 110 does not perform the eyewear detection operation itself. The eyewear detection operation may be performed by a further entity (not shown), which transmits the data representing the result to the eyewear detector 110. The data representing the result may be received by the eyewear detector 110 to enable the eyewear detector 110 to infer whether or not the user is wearing the eyewear. The eyewear detector 110 may thus be considered to either directly or indirectly perform eyewear detection.

The display adjuster 120 is configured to output a control signal to adjust a display parameter of the display device. "Display parameter" is used herein to describe a configurable property or setting of the display device, as opposed to merely the visual content that is displayed. The outputting the control signal is dependent on the data obtained by the eyewear detector 110. The control signal may comprise an electrical signal operable to control one or more operations, components and/or functions of the display device. The control signal may be operable to control one or more hardware drivers of the display device, for example. The control signal may be generated by the apparatus 100. In some examples, the apparatus 100 is configured to output multiple control signals. In some examples, the display adjuster 120 is configured to adjusting multiple display parameters of the display device.

In an example, the predetermined type of eyewear comprises sunglasses, and the display parameter to be adjusted comprises an output luminance of the display device. The output luminance may be a measure of an amount of light that is emitted from the display device. The output luminance of the display device corresponds to a perceived level of brightness of the display device, as viewed by the user. As such, the apparatus 100 may be configured to adjust an output luminance of a display device based on detecting whether or not a user of the display device is wearing sunglasses. For example, when a user takes the display device outdoors on a sunny day and puts on a pair of sunglasses, the luminance of the display device may be adjusted based on the presence of the sunglasses, additionally or alternatively to the ambient light conditions. Adjusting the luminance based on the wearing of sunglasses increases a level of visual legibility and/or comfort for the user compared to a case in which the luminance is not adjusted, and/or reduces the likelihood of the user having to remove the sunglasses in order to readily see and/or read the displayed content. Other display parameters or settings may be adjusted and/or other types of eyewear may be detected in other examples, as will be described in more detail below.

In examples where the apparatus 100 performs the eyewear detection operation, the apparatus 100 may comprise computer vision (CV) functionality. The CV functionality may be incorporated into the eyewear detector 110, for example. CV functionality may include the processing of image data to extract relatively high-level information describing the content of the image. High dimensional data may be extracted in order to produce numerical or symbolic information, e.g. in the form of decisions. The extracted information may be used in conjunction with decision-making processes to elicit actions and/or to further understanding of the image. CV functionality may include performing object detection and/or classification. Processing of image data may be performed by a central processing unit (CPU), graphics processing unit (GPU) or a dedicated CV or object recognition engine.

Processing image data using object detection and/or recognition may involve the use of one or more trained artificial neural networks (ANNs). ANN refers herein to neural networks having any arbitrary architecture, network size or depths. The ANN may thus be used to determine whether or not the user is wearing the eyewear of the predetermined type. Using an ANN to perform object detection and/or recognition may increase an accuracy and/or reliability of object detection and/or recognition compared to some known techniques. An ANN may be trained to detect and locate objects in an image, and/or to classify those objects using a plurality of predefined object classes or types. In this context, different types of eyewear may correspond to different classes used by an ANN, for example. Performing object recognition to detect eyewear may comprise performing 2D or 3D facial recognition on the obtained image data.

Some existing display devices and/or controllers for display devices are equipped with object recognition functionality. For example, some devices may be configured to use facial recognition to unlock the device and/or perform other authentication functions. An image of a user may be captured, e.g. by a front-facing camera, and facial recognition performed on the captured image data to authenticate the user. In examples described herein, such devices are configured to perform eyewear detection using images that are also used for facial recognition. Image data may therefore be re-used for eyewear detection, instead of having to be obtained separately or solely for eyewear detection purposes, thereby reducing an amount of processing and/or storage, reducing latency and/or increasing efficiency. Further, since such devices may already be equipped with object recognition functionality for facial recognition, e.g. through the use of trained artificial neural networks (ANN), such functionality may be re-used and/or adapted for eyewear detection. Therefore, an amount of modification and/or upgrading required to enable an existing or legacy device to perform eyewear detection may be reduced.

Figure 2:
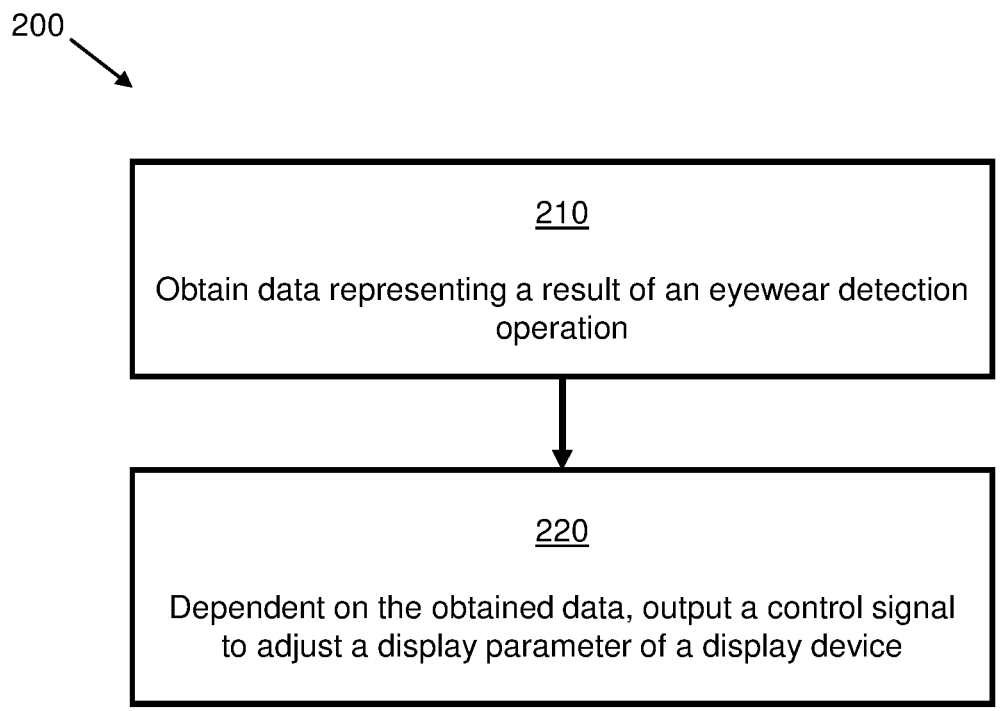
FIG. 2 shows schematically a method of controlling a display device according to an example.

FIG. 2 shows schematically a method 200 for controlling a display device according to an aspect of the present disclosure. At least one portion of the method 200 may be implemented by the apparatus 100 shown in FIG. 1.

In an example, at least one portion of the method 200 is implemented by executable code, stored on a non-transitory storage medium, that includes instructions, that when executed by at least one processor, causes the at least one processor to perform the at least one portion of the method 200 described herein. In another case, at least one portion of the method 200 is implemented by at least one ASIC. The ASIC may be standard, fully customized or partially customized. In one example, the ASIC may have a structured design. The ASIC may comprise at least one microprocessor and/or at least one memory block. In another example, the ASIC comprises at least one gate array such as a field-programmable gate array. The field-programmable gate array may comprise an array of programmable logic blocks and a hierarchy of reconfigurable interconnects. The array of programmable logic blocks may, in some examples, comprise memory elements such as flip-flops. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

At block 210, data representing a result of an eyewear detection operation is obtained.

In some examples, the data representing a result of the eyewear detection operation is generated. In other words, the eyewear detection operation may be performed. For example, the eyewear detection operation may be performed and the data representing the result of the operation generated accordingly. In other examples, the data representing a result of an eyewear detection operation is received, e.g. from another entity. For example, the other entity may perform the eyewear detection operation and output the result of the operation.

Performing the eyewear detection operation comprises receiving image data representing a user of the display device. In some examples, the image data is received from an image sensor, e.g. comprised in a camera. The image data may comprise pixel data. In some examples, the image data comprises decoded image data output from an image or video decoder. In some examples, the image data is received from a memory.

Performing the eyewear detection operation further comprises processing the image data using object recognition to determine whether or not the user is wearing eyewear of a predetermined type. Using object recognition techniques to perform eyewear detection may be more accurate and/or reliable than other methods. Processing the image data may comprise using an ANN. Performing object recognition may comprise performing object detection. In some examples, object detection is performed in an initial processing stage, and object recognition is performed in a subsequent processing stage, e.g. to identify or classify the detected object(s).

In some examples, object recognition processing is focused on one or more target sub-regions of the image. The one or more target sub-regions comprise an area corresponding to the user's eyes. Thus, processing resources associated with performing object recognition are focused towards image sub-regions where eyewear is likely to be located. For example, object recognition may be performed in only the one or more target sub-regions corresponding to the user's eyes. In some examples, object recognition is performed with a first discriminatory power in the one or more target sub-regions, and is performed with a second discriminatory power in further image sub-regions. A discriminatory power may relate to an ability to distinguish between visually similar objects. For example, a given discriminatory power may correspond to a sensitivity or granularity level with which objects may be distinguished. The discriminatory power may be based on the structure and/or training of an ANN used to perform object recognition, for example. The discriminatory power may additionally or alternatively be based on a number of distinct object classes used in object recognition. Object recognition in the one or more target sub-regions may have a finer granularity than object recognition in the further sub-regions. By using fewer object classes and/or a lower discriminatory power for the further sub-regions, object recognition in the further sub-regions may require less computation and/or processing power than a case in which the same number of object classes and/or the same discriminatory power are used for both the target sub-region(s) and the further sub-regions. As such, processing resources used for processing the further sub-regions may be reduced and/or redistributed towards the task of performing object recognition in the one or more target sub-regions, thereby increasing an efficiency of processing.

At block 220, dependent on the data obtained at block 210, a control signal is outputted to adjust a display parameter of the display device. As such, the display parameter of the display device is adjusted based on a determination of whether or not a user of the display device is wearing eyewear of a predetermined type. The control signal may be operable to control a hardware driver of the display device.

A hardware driver is a computer program that is arranged to control a particular type of hardware.

In some examples, the display parameter comprises an output luminance of the display device. Adjusting the output luminance may comprise adjusting luminance values of pixels of the display device. In some examples, for example where the display device comprises a liquid crystal display (LCD) device, adjusting the output luminance comprises adjusting a backlight of the display device. In some examples the display comprises an LCD-LED or QLED device, in which a light emitting diode (LED) arrangement is used a backlight for an LCD display. In other examples, for example where the display device comprises an organic light-emitting diode (OLED) device, adjusting the output luminance comprises adjusting a voltage applied across the OLED. As such, an output luminance of the display device may be adjusted, thereby causing the perceived brightness of the display to change, based on a determination of whether or not the user is wearing the eyewear. Luminance may also be increased by altering the colors of the image being displayed. For example, where the image is relatively dark, the average luminance of one or more of the color channels may be increased to make the image brighter.

In some examples, the control signal is operable to cause the display device to perform a spatially-varying image processing algorithm for adjusting a display output of the display device. The spatially-varying image processing algorithm may involve adjusting an image displayed by the display device. The spatially-varying image processing algorithm may involve adjusting luminance values of pixels in some image regions, e.g. relatively dark regions, differently to luminance values of pixels in other image regions, e.g. relatively bright regions. In some examples, the luminance values of pixels in the relatively bright regions are left unchanged. The spatially-varying image processing algorithm may involve other forms of spatially-variant image adjustment in other examples. In some examples, the spatially-varying image processing algorithm comprises a spatially-varying dynamic range compression algorithm, as described in international patent application no. PCT/GB2002/001675, the entire contents of which are incorporated herein by reference. Performing a spatially-varying image processing algorithm may result in a more comfortable viewing experience for the user and/or may increase an efficiency of displaying power whilst maintaining a sufficient displayed dynamic range.

In some examples, the display parameter comprises an output color profile of the display device. The output color profile may comprise data specifying how a given color is to be displayed by the display device. In some examples, adjusting the display parameter involves adjusting the output color profile of a single color in a set of colors representable by the display device. In other examples, adjusting the display parameter involves adjusting color profiles for multiple representable colors. In some examples, adjusting the display parameter involves adjusting the color profiles for every color representable by the display device. Adjusting the output color profile of the display device allows color properties of the eyewear to be compensated for. For example, if the user is wearing sunglasses with red lenses, the output color profile of the display device may be adjusted so as to compensate for such, resulting in a more comfortable viewing experience for the user.

In some examples, the display parameter comprises a tone mapping function implemented by the display device. Hence a tone mapping function may be adjusted based on a determination of whether or not the user is wearing eyewear of a predetermined type. Tone mapping may be used to approximate the appearance of a higher dynamic range image using a display device having an inherently lower dynamic range. A tone mapping function may be used to more closely match a brightness sensation of a displayed image to a real-world brightness sensation. The tone mapping function may be configured to map a first set of colors to a second set of colors. Tone mapping may involve increasing contrast within a displayed image. The tone mapping function may comprise localized tone mapping. The tone mapping function may perform tone mapping and/or contrast adjustment differently for different image regions. As such, the tone mapping function may involve spatially-varying tone mapping.

In some examples, the display parameter comprises an output contrast ratio of the display device. The output contrast ratio may comprise a ratio of the luminance of the brightest color to that of the darkest color that the display device is capable of producing.

In some examples, a current luminance value of the display device is determined. The current luminance value may be derived from an average luminance value across the pixels of the display device. In other examples, the current luminance value is derived from a median, maximum or minimum luminance value across the pixels of the display device. The current luminance value may be derived based on luminance values of pixels in some image regions but not other image regions. The control signal may be based at least in part on a comparison between the current luminance value and a threshold value.

In some examples, based on the current luminance value having a first predetermined relationship with the threshold value, the control signal is operable to adjust a first display parameter of the display device. The first display parameter may comprise an output luminance or display brightness, for example. Based on the current luminance value having a second predetermined relationship with the threshold value, the control signal is operable to adjust a second display parameter of the display device. The second display parameter may comprise one of an output contrast ratio and an output color profile. For example, when the current luminance value is below the threshold value, the output luminance may be adjusted, and when the current luminance exceeds the threshold value, the output contrast ratio may be adjusted. Adjusting different display parameters depending on the current luminance value may enable a perceived level of visual clarity to be optimized. For example, for luminance values below the threshold value, visual clarity may be most effectively and/or efficiently increased by adjusting the display brightness, whereas for luminance values above the threshold value, adjusting the display brightness may not increase the visual clarity, or may increase the visual clarity by a lesser amount than would be achieved by instead adjusting another display parameter such as a color profile or a contrast ratio.

In some examples, the predetermined type of eyewear comprises sunglasses. As such, a display parameter of the display device is adjusted based on a determination of whether or not the user of the display device is wearing sunglasses. The display parameter may be adjusted in response to the user wearing the sunglasses or not wearing the sunglasses. For example, the output luminance of the display device may be increased in response to determining that the user is wearing and/or has put on the sunglasses, and the output luminance may be decreased in response to determining that the user is not wearing and/or has taken off the sunglasses. Decreasing the output luminance based on a determination that the user is not wearing the sunglasses reduces a power consumption of the display device compared to a case in which the output luminance is not decreased.

The predetermined type of eyewear may comprise eyewear other than sunglasses in other examples. For example, the predetermined type of eyewear may comprise tinted contact lenses, goggles, visors or protective eye equipment. In some examples, the predetermined type of eyewear comprises glasses having photochromic lenses, also known as "transition lenses". The amount of tint of such lenses changes depending on the ambient light conditions to which the lenses are exposed. In an example, glasses having photochromic lenses are detected in the eyewear detection operation regardless of whether the lenses are currently tinted or non-tinted. In another example, glasses having photochromic lenses are detected in the eyewear detection operation only when the lenses are tinted.

In some examples, the predetermined type of eyewear comprises a predetermined class of sunglasses. In such examples, the control signal is based at least in part on the predetermined class of sunglasses. The predetermined class may comprise a predetermined type, brand or model of sunglasses, for example. As such, the display parameter may be adjusted for only a subset of possible sunglasses, or may be adjusted differently for different classes of sunglasses. Adjusting of the display device may thus be tuned or adapted according to the properties of the sunglasses worn by the user, thus enabling a perceived level of visual clarity to be optimized.

In some examples, an eyewear profile database is accessed on the basis of the predetermined type of eyewear that is detected. The eyewear profile database may be stored locally, e.g. on a local memory, or in a cloud network, e.g. on a server. The eyewear profile database stores eyewear profile data, which may be retrieved by accessing the database. The eyewear profile database may store information relating to how the display parameter(s) of the display device are to be adjusted for different types of eyewear. In some cases, the eyewear profile database stores data indicating optical transmittance spectra for different types of eyewear, e.g. different models, makes and/or tints of sunglasses. Such information may be pre-stored, and/or may be based on optical measurements of the different types of eyewear. In some examples, the eyewear profile database is updated based on the eyewear detection. For example, if it is determined that a given type of eyewear that has been detected is not currently represented in the eyewear profile database, a database entry for the given type of eyewear may be created. The database entry for the given type of eyewear may be populated by data derived from optical measurements of the eyewear, for example. In some examples, the database entry for the given type of eyewear is populated by user-defined data, e.g. data indicating how a user wishes the display device to be adjusted for the given type of eyewear.

In some examples, an optical transmittance function of the eyewear is determined. An optical transmittance function indicates how different spatial frequencies or wavelengths of light are transmitted through the eyewear, e.g. through a lens. The optical transmittance function may be referred to as a "transmittance spectrum" or "transmittance profile". The optical transmittance function is an example of an optical profile of the eyewear. The optical transmittance function may be obtained from and/or stored in a database storing eyewear profile data. The database may be accessed on the basis of the type, make and/or model of eyewear being detected. In some examples, the optical transmittance function is measured, e.g. using one or more optical sensors. The control signal may be based at least in part on the determined optical transmittance function. As such, the optical transmittance properties of the eyewear may be taken into account when adjusting the display parameter of the display device.

In some examples, a color value associated with the eyewear is determined. The color value may be indicative of a peak or dominant wavelength in the transmittance spectrum of the eyewear. In some examples, a tint value associated with the eyewear is determined. Tinted eyewear may absorb more light of particular wavelengths than non-tinted eyewear, thereby protecting the eyes of the wearer from such light. The tint value may influence how different spatial frequencies of light are transmitted through the eyewear. A tint value may be associated with a lighter or darker variation of a color. That is, how dark or light a given color is. The color value and/or tint value may be obtained from and/or stored in a database storing eyewear profile data. In some examples, the tint value of the eyewear is measured, e.g. by using data generated by one or more light sensors and/or by analyzing a captured image of the eyewear. The control signal may be based at least in part on the determined tint value. As such, the tint of the eyewear may be taken into account when adjusting the display parameter of the display device.

In some examples, the control signal is based at least in part on a predetermined characteristic of detected ambient light. Ambient light may be detected by one or more optical sensors. Examples of predetermined characteristics of the ambient light include, but are not limited to, brightness, spectral information, hue, colorfulness and saturation. For example, where the display parameter comprises an output luminance of the display device, the amount by which the output luminance is adjusted may be dependent on the ambient brightness in the surroundings of the display device. In another example, where the display parameter comprises an output color profile of the display device, the output color profile may be adjusted to compensate for color properties of the ambient light. For example, if the display device is being viewed under blue ambient light, an amount of blue in the output color profile of the display may be reduced to compensate for such. Adjusting the display parameter based on the detected ambient light may further optimize a perceived level of visual clarity of the output of the display device.

In some examples, a distance is determined between the display device and one or more of the eyewear and the user. The distance may be determined using an infrared sensor, for example, or by analyzing the image, for example using a mono-depth convolutional neural network (CNN). In such examples, the control signal may be based at least in part on the determined distance. As such, the distance between the display device and the user and/or the eyewear is taken into account when adjusting the display parameter. The display parameter may comprise a size of text and/or images displayed by the display device. Therefore, for example, the size of displayed text may be adjusted depending on the distance between the display device and the user, e.g. by increasing the size of the displayed text if it is determined that the distance exceeds a predetermined threshold. Thus, visual clarity and/or legibility may be increased compared to a case in which the distance between the user and the display device is not taken into account.

In some examples, an orientation of the display device is determined. The determined orientation may be relative to the eyewear and/or the user. In some examples, the determined orientation is relative to one or more reference points in the environment of the display device. The one or more reference points may be fixed in the environment. The control signal may be based at least in part on the determined orientation of the display device.

Taking the orientation of the display device relative to the user and/or eyewear into account allows the selective filtering of light by the combination of the display device and the eyewear to be compensated for. The display device may emit polarized light. For example, display devices comprising an LCD may emit linearly polarized light, that is, the electric field vector of the emitted light may be confined to a given plane along the direction of propagation. LCD devices may comprise a pair of polarizing filters, angularly offset from one another, with a liquid crystal arranged between them. Color filters and/or thin-film transistors may also be arranged between the two polarizing filters. The polarization state of light emitted from the display device may be determined by the final or downstream polarizing filter, e.g. the polarizing filter nearest the display surface of the display device. In some cases, the eyewear also comprises a polarizing filter. For example, the eyewear may comprise polarizing sunglasses. The eyewear may selectively filter light impinging on it according to the polarization state of the light. For example, horizontally polarized light may be filtered by the eyewear whereas vertically polarized light may be allowed to pass through the eyewear, in order to reduce glare caused by light reflecting off horizontal surfaces. Therefore, the amount of light emitted from the display device that can pass through the eyewear may be dependent on the orientation of the display device relative to the eyewear. When the display device is in a "landscape" mode, for example, the polarizing filter of the eyewear may be substantially aligned with the final polarizing filter of the display device, allowing most of the emitted light to pass through to the eyes. When the display device is in a "portrait" mode, however, the polarizing filter of the eyewear may be out of alignment, e.g. perpendicular, to the final polarizing filter of the display device, thereby causing a substantial portion of the emitted light to be absorbed by the eyewear rather than passing to the eyes, resulting in a perceived undesirable "darkening" of the image. Therefore, the control signal may be operable to adjust the luminance of the display device depending on the orientation of the display device relative to the eyewear. For example, the luminance may be increased by a first amount if it is determined that the polarizing filter of the eyewear is substantially in alignment with the final polarizing filter of the display device, and the luminance may be increased by a second, greater, amount if it is determined that the polarizing filter of the eyewear is not in alignment with, or is substantially perpendicular to, the final polarizing filter of the display device. In some examples, the luminance is increased only in the latter case, and is not increased when the polarizing filter of the eyewear is substantially in alignment with the final polarizing filter of the display device. As such, the display parameter of the display device may be adjusted based on a polarization relationship between the display device and the eyewear. The polarization properties of the eyewear may be measured and/or determined from the database storing eyewear profile data.

In some examples, the display parameter to be adjusted comprises an output polarization characteristic of the display device. The output polarization characteristic may influence the polarization state of light emitted from the display device. The output polarization characteristic may determine how light is selectively filtered by the display device prior to being emitted from the display device.

In some examples, the display device comprises a liquid crystal display panel and a polarization modulator. The polarization modulator is configured to modulate a polarization state of light emitted from the liquid crystal display panel. The polarization modulator may comprise a Fast Polarization Modulator (FPM). In some examples, the polarization modulator comprises a liquid crystal polarization modulator. The polarization modulator may be an electro-optical device. An electro-optical polarization modulator may have fewer moving parts than a mechanical polarization modulator, and thus may be less prone to errors, misalignment and/or deterioration over time. In examples, the control signal may be operable to control the polarization modulator. For example, the control signal may be operable to perform one or more of actuating, activating, de-activating, adjusting and changing a state of the polarization modulator. The control signal may cause a voltage to be applied to the polarization modulator to drive the polarization modulator. As such, the control signal may be operable to change the polarization state of light emitted from the liquid crystal display panel. For example, light emitted from the liquid crystal display panel may have a first polarization state prior to the control signal being outputted, and may have a second polarization state as a result of the control signal being outputted, due to the controlling of the polarization modulator. In an LCD device, one or both of the polarizing filters of the device may be replaced by a polarization modulator. The polarization modulator may be adjusted based on a determined orientation of the display device relative to the eyewear.

By adjusting the output polarization characteristic of the display device, the proportion of light impinging on the eyewear that is absorbed by the eyewear may be adjusted. For example, by more closely matching the polarization characteristics of the display device and the eyewear, the amount of light emitted from the display device that is able to pass through the eyewear may be increased, resulting in a perceived increase in brightness. Such a perceived increase in brightness may be obtained without requiring an increase in luminance of the display device, e.g. by increasing power applied to a backlight. Thus, a perceived level of visual clarity and/or quality may be increased without an associated increase in power consumption of the display device. In some examples, both the output polarization characteristic of the display device and an output luminance of the display device are adjusted.

In some examples, the display device comprises a polarization rotator. The polarization rotator may be configured to rotate a polarizing filter by any arbitrary angle. The polarization rotator may comprise a variable polarization rotator. Adjusting the output polarization characteristic of the display device may comprise adjusting the polarization rotator. The polarization rotator may be adjusted so as to change the polarization state of light emitted from the display panel. A polarization rotator may provide a relatively fine-grained control of the polarization state of light passing therethrough. In some examples, polarization rotators are configured to rotate both polarizing filters of an LCD device. The two polarizing filters may be rotated synchronously and/or by a same amount so as to maintain a predetermined angular offset between the two filters. The polarization rotator(s) may be adjusted so as to more closely match a polarization characteristic of the eyewear. The polarization rotator(s) may be adjusted based on a determined orientation of the display device relative to the eyewear. For example, if it is determined that an angle between the display device and the eyewear is 15 degrees, the polarizing filters of the display device may each be rotated by 15 degrees, to reduce an amount of light absorbed by the eyewear.

In some examples, a calibration process is performed for a given item of eyewear and/or a given type of eyewear. The calibration process may involve measuring one or more optical properties of the eyewear. In some examples, the calibration process involves determining an optical transmittance function of the eyewear. The calibration process may comprise obtaining an image of the eyewear and comparing such an image to a reference image. The reference image may depict a white wall or a mirror, for example. In some examples, the calibration process comprises emitting light in the form of a color test pattern and measuring a received version of the color test pattern, the received version having been reflected off the mirror and passed through the eyewear. Such a measurement may be indicative of the transmittance and/or absorption properties of the eyewear. In some examples, the calibration process comprises receiving ambient light having passed through the eyewear, and determining a response function of the eyewear to the ambient light.

Figure 3A:
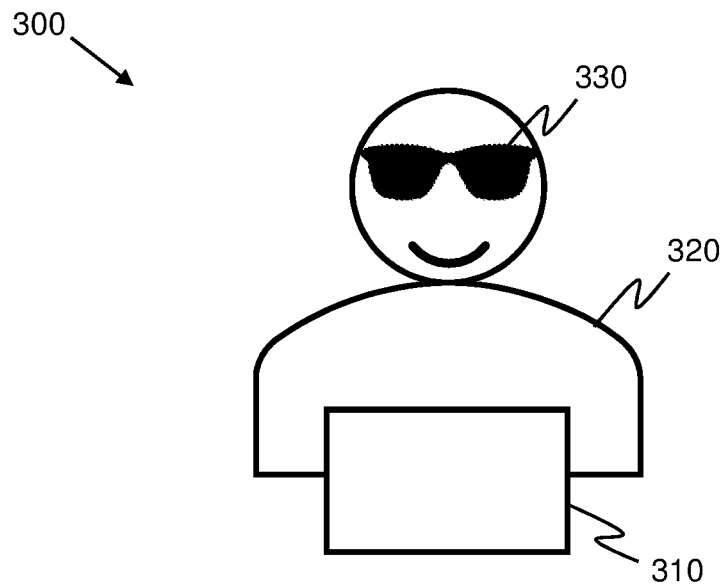
FIG. 3A shows schematically an arrangement including a display device and a user in a first case.

FIG. 3A shows an arrangement 300 including a display device 310 and a user 320 according to a first case. In the arrangement 300, the user 320 is viewing a display, e.g. an image or video, being displayed on a display device 310. The display device 310 may comprise an LCD device, for example.

In this case, the user 320 is wearing sunglasses 330. The sunglasses 330 are an example of eyewear. The sunglasses 330 reduce an amount of light reaching the eyes of the user 320. Light emitted from the display device 310 is filtered by the sunglasses 330 before the light can reach the eyes of the user 320. As such, the sunglasses 330 form a barrier between the display device 310 and the user 320.

In accordance with examples described herein, an eyewear detection operation is performed to determine whether the user 320 is wearing sunglasses. The eyewear detection operation may be performed by the display device 310 itself, or by another apparatus (not shown). The result of the eyewear detection operation indicates that the user 320 is wearing the sunglasses 330. In some cases, the result may indicate that the user 320 is wearing a particular type, model or brand of sunglasses, and/or may indicate a particular light transfer function, tint value or other optical property of the sunglasses 330. In dependence on the result of the eyewear detection operation, a display parameter of the display device 310 is adjusted. For example, the output luminance of the display device 310 is increased based on the determination that the user 320 is wearing the sunglasses 330.

Figure 3B:
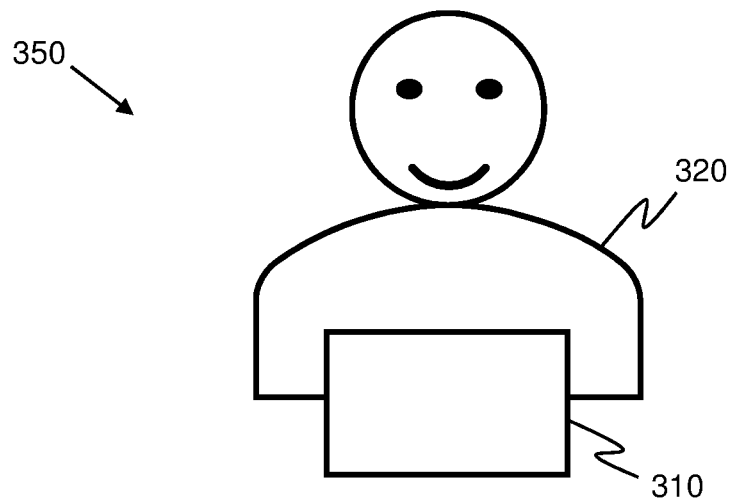
FIG. 3B shows schematically an arrangement including a display device and a user in a second case.

FIG. 3B shows an arrangement 350 including the display device 310 and the user 320 according to a second case. In the arrangement 350, the user 320 is not wearing sunglasses. In accordance with examples described herein, an eyewear detection operation is performed to determine whether the user 320 is wearing sunglasses. In this case, the result of the eyewear detection operation indicates that the user 320 is not wearing sunglasses. In dependence on the result of the eyewear detection operation, a display parameter of the display device 310 is adjusted. For example, the output luminance of the display device 310 is reduced based on the determination that the user 320 is not wearing sunglasses.

FIG. 4 shows schematically a method 400 for controlling a display device according to an aspect of the present disclosure. At least one portion of the method 400 may be implemented by the apparatus 100 shown in FIG. 1. In some examples, at least one portion of the method 400 is performed by the display device. In an example, at least one portion of the method 400 is implemented by executable code, stored on a non-transitory storage medium, that includes instructions, that when executed by at least one processor, causes the at least one processor to perform the at least one portion of the method 400 described herein.

At block 410, a polarizing filter is detected. The polarizing filter is positioned between the display device and an eye of a user of the display device. In some examples, the polarizing filter is comprised in sunglasses worn by the user, e.g. polarizing sunglasses. The polarizing filter may comprise or be comprised in other objects in other examples. For example, the polarizing filter may be comprised in a privacy screen filter attached to an outer surface of the display device.

In some examples, the polarizing filter is detected based on an object recognition operation. For example, an image depicting the user may be obtained and object recognition performed on the image to recognize the polarizing filter. The object recognition operation may involve the use of one or more trained ANNs configured to recognize polarizing filters of a particular type.

In some examples, the polarizing filter is detected by means other than object recognition. For example, where the polarizing filter is comprised in sunglasses, the sunglasses may be equipped with a signal transmitter to transmit a signal indicating that the sunglasses are being worn. Receipt of such a signal enables the apparatus performing the method 400 to infer the presence of the sunglasses without having to perform object recognition based on image processing. In another example, the polarizing filter is detected by an infrared or ultrasonic sensor. In a further example, a measure of coloration and/or lighting in a region immediately surrounding the user's eyes may be analyzed to infer the presence of a polarizing filter in front of the user's eyes. An image depicting the user may be obtained. A first image region corresponding to an area immediately surrounding and/or including the user's eyes may be compared to a second image region. The second image region may correspond to a reference area of the environment, e.g. an area comprising a wall or reference object. In some examples, the second image region is part of a reference image, the reference image having been previously obtained and stored. The reference image may depict the user in the absence of a polarizing filter placed between the user's eyes and the display device. The first and second image regions may be compared to infer the presence of the polarizing filter in front of the user's eyes. Comparing the first and second image regions may comprise comparing measures of one or more of brightness, contrast, color and light transmission for the first and second image regions.

At block 420, an output polarization characteristic of the display device is adjusted. The output polarization characteristic is adjusted dependent on the detecting the polarizing filter. The output polarization characteristic may influence a polarization state of light emitted from the display device. The polarization state may comprise a polarization direction of linearly polarized light. The display device may selectively filter light emitted therefrom based on the polarization state of the light. The output polarization characteristic may determine how such light is selectively filtered. Adjusting the output polarization characteristic may comprise adjusting a polarization modulator configured to modulate a polarization state of light passing therethrough, as described above. In some examples, adjusting the output polarization characteristic comprises adjusting a polarization rotator. In some examples, adjusting the output polarization characteristic causes initially unpolarized light having been emitted from the display device to be polarized. In other examples, adjusting the output polarization characteristic causes the polarization state of initially polarized light having been emitted from the display device to change. For example, the adjusting the output polarization characteristic of the display device may cause the polarization direction of linearly polarized light to be modulated by 90 degrees.

In some examples, a polarization characteristic of the polarizing filter is determined. The polarization characteristic of the polarizing filter may indicate how light is selectively filtered by the polarizing filter. The output polarization characteristic of the display device may be adjusted based on the polarization characteristic of the polarizing filter. In some examples, the output polarization characteristic of the display device is adjusted based on a comparison between the output polarization characteristic of the display device and the polarization characteristic of the polarizing filter. For example, the output polarization characteristic of the display device may be adjusted so as to more closely match the polarization characteristic of the polarizing filter.

In some examples, an orientation of the display device relative to the polarizing filter is determined, and the output polarization characteristic of the display device is adjusted based on the orientation. For example, the output polarization characteristic may be adjusted if it is determined that the polarizing filter is not in alignment with a polarizing filter of the display device. Adjusting the output polarization characteristic of the display device may comprise rotating the polarizing filter of the display device so as to more closely align the polarizing filter of the display device with the polarizing filter of the eyewear.

Figure 5:
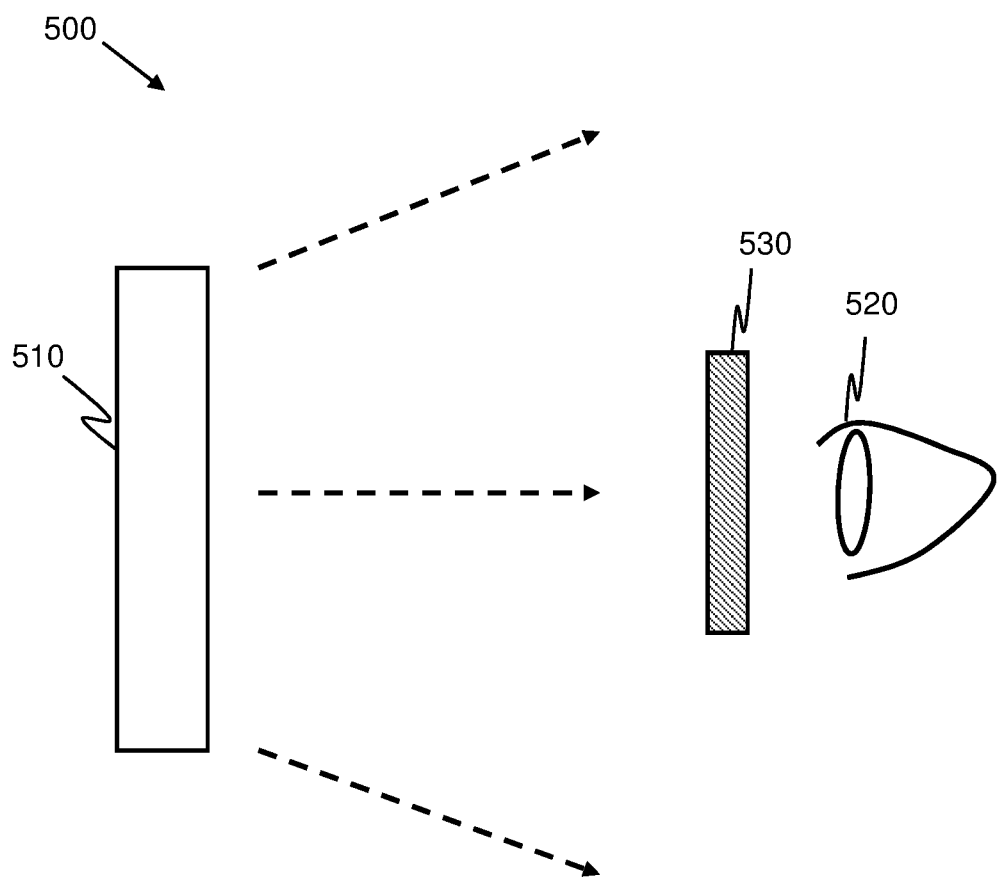
FIG. 5 shows schematically an arrangement including a display device and a polarizing filter.

FIG. 5 shows an arrangement 500 according to an example. The arrangement 500 includes a display device 510, an eye 520 of a user of the display device 510, and a polarizing filter 530.

The polarizing filter 530 is positioned between the display device 510 and the eye 520. The polarizing filter 530 may comprise, for example, a polarizing lens of a pair of sunglasses, a polarizing screen protector, or any other barrier configured to selectively filter light passing from the display device 510 towards the eye 520 according to the polarization state of the light.

In accordance with some examples described herein, the polarizing filter 530 positioned between the display device 510 and the eye 520 is detected. The polarizing filter 530 may be detected via image processing or other means, as described above. Based on the detection of the polarizing filter 530, an output polarization characteristic of the display device 510 is adjusted. The output polarization characteristic of the display device 510 may be adjusted so as to more closely match a polarization characteristic of the polarizing filter 530. Adjusting the output polarization characteristic of the display device 510 may result in a greater amount of light reaching the eye 520 than would otherwise be the case. In other words, the proportion of light impinging on the polarizing filter 530 that is filtered by the polarizing filter 530 may be reduced. Thus, a perceived level of brightness may be increased without increasing the output luminance of the display device, thereby increasing efficiency and/or reducing power consumption of the display device whilst enhancing the viewing experience for the user.

In some examples, an eye position of a user of a display device is identified. The eye position may be identified using facial recognition or other means. A determination is made as to whether or not light emitted from the display device is being filtered by a filtering apparatus positioned between the display device and the eye position of the user. The determination may be based on analyzing an image region corresponding to the eye position, for example. Based on said determining, a display property of the display device is adjusted.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method of controlling a display device, the method comprising:
   obtaining data representing a result of an eyewear detection operation;
   determining a current luminance value of the display device; and
   dependent on the obtained data, outputting a control signal to adjust a display parameter of the display device, wherein the control signal is based at least in part on a comparison between the current luminance value and a threshold value, wherein, based on the current luminance value having a first predetermined relationship with the threshold value, the control signal is operable to adjust, as the display parameter, a first display parameter of the display device, and wherein, based on the current luminance value having a second predetermined relationship with the threshold value, the control signal is operable to adjust, as the display parameter, a second, different, display parameter of the display device,
   wherein performing the eyewear detection operation comprises:
      receiving image data representing a user of the display device; and
      processing the image data using object recognition to determine whether or not the user is wearing eyewear of a predetermined type.

2. A method according to claim 1, wherein the obtaining the data comprises performing the eyewear detection operation.

3. A method according to claim 1, wherein the processing the image data comprises using at least one artificial neural network.

4. A method according to claim 1, wherein the predetermined type comprises sunglasses.

5. A method according to claim 1,
   wherein the predetermined type comprises a predetermined class of sunglasses, and
   wherein the control signal is based at least in part on the predetermined class of sunglasses.

6. A method according to claim 1, wherein the display parameter comprises an output luminance of the display device.

7. A method according to claim 1, wherein the display parameter comprises an output color profile of the display device.

8. A method according to claim 1, wherein the display parameter comprises a tone mapping function implemented by the display device.

9. A method according to claim 1, the method comprising determining an orientation of the display device relative to the eyewear and/or the user, wherein the control signal is based at least in part on the determined orientation.

10. A method according to claim 1, wherein the display parameter comprises an output polarization characteristic of the display device.

11. A method according to claim 1, wherein the display device comprises a liquid crystal display panel and a polarization modulator, the polarization modulator being configured to modulate a polarization state of light having been emitted from the liquid crystal display panel, the control signal being operable to control the polarization modulator.

12. A method according to claim 1, the method comprising determining a distance between the display device and one or more of the eyewear and the user, wherein the control signal is based at least in part on the determined distance.

13. A method according to claim 1, the method comprising determining an optical transmittance function of the eyewear, wherein the control signal is based at least in part on the determined optical transmittance function.

14. A method according to claim 1, the method comprising determining a tint value associated with the eyewear, wherein the control signal is based at least in part on the determined tint value.

15. A method according to claim 1, wherein the control signal is based at least in part on a predetermined characteristic of detected ambient light.

16. A method according to claim 1, wherein the control signal is operable to cause the display device to perform a spatially-varying image processing algorithm for adjusting a display output of the display device.

17. Apparatus for controlling a display device, the apparatus comprising:
 an eyewear detector configured to obtain data representing a result of an eyewear detection operation; and
 a display adjuster configured to determine a current luminance value of the display device, and, dependent on the obtained data, output a control signal to adjust a display parameter of the display device, wherein the control signal is based at least in part on a comparison between the current luminance value and a threshold value, wherein, based on the current luminance value having a first predetermined relationship with the threshold value, the control signal is operable to adjust, as the display parameter, a first display parameter of the display device, and wherein, based on the current luminance value having a second predetermined relationship with the threshold value, the control signal is operable to adjust, as the display parameter, a second, different, display parameter of the display device,
 wherein performing the eyewear detection operation comprises:
  receiving image data representing a user of the display device; and
  processing the image data using object recognition to determine whether or not the user is wearing eyewear of a predetermined type.

* * * * *